> United States Patent Office 3,513,283
Patented May 19, 1970

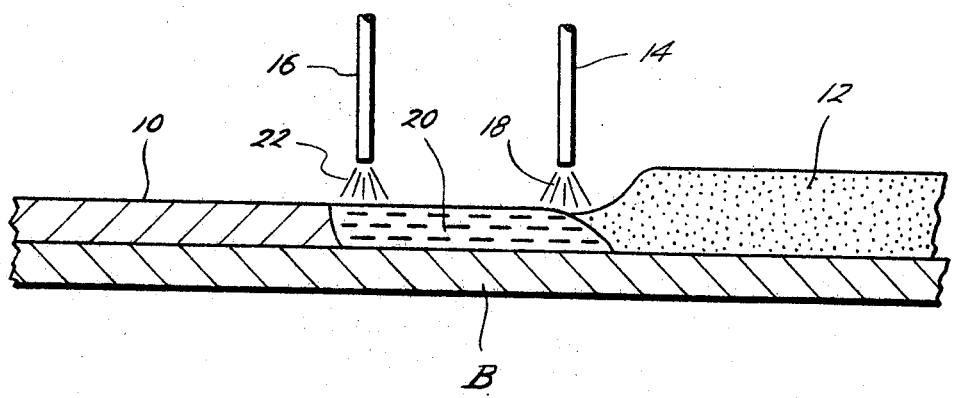

3,513,283
TANDEM ARC WELDING METHOD
Roman F. Arnoldy, Houston, Tex., assignor to R. I. Patents, Inc., Houston, Tex., a corporation of Texas
Filed May 8, 1968, Ser. No. 727,485
Int. Cl. B23k 9/18, 25/00
U.S. Cl. 219—73                                5 Claims

ABSTRACT OF THE DISCLOSURE

A method of welding a base metal by placing a layer of alloy granules on the surface of the base metal and then simultaneously moving at least two consumable electrodes in tandem in a generally linear direction along the layer of alloy granules while maintaining an arc from the lead electrode to the edge of the granules adjacent the puddle formed by the arc from the lead electrode and an arc from the trailing electrodes to the same puddle, the arcs being free of contact with the surface of the base metal.

BACKGROUND OF THE INVENTION

The field of art to which the invention pertains is electric welding and more particularly to what is sometimes termed "bulk welding." "Bulk welding" as used herein means electric arc welding using a consumable electrode and a layer of granular (including powder) alloy material laid on the base metal. "Welding" as used herein includes securing pieces of base metal together, clauding, and the like. The alloy granules may have the same or a different composition from that of the consumable electrode.

The prior art such as Pat. No. 3,076,888 issued Feb. 5, 1963 to R. F. Arnoldy for an invention in "Method of Producing Weld Coatings or Fusion Welds" illustrates several examples of bulk welding by the use of a single consumable electrode.

Pat. No. 3,296,408 issued Jan. 3, 1967 to R. F. Arnoldy for an invention in "Dual Arc Welding teaches in bulk welding the use of a pair of consumable electrodes which are located side by side with respect to the general linear movement of the welding head.

Applicant believes the prior art includes tandem consumable electrodes used without any granular alloy material and with the arcs from the electrodes contacting the base metal.

SUMMARY OF THE INVENTION

The electric arc from a consumable electrode used in welding has physical force. When this arc is directed against a layer of granular material in bulk welding, it disturbs the granular material and quite often the arc is of such size that it will disperse a sufficient amount of the granular material to allow the arc to directly contact the base metal on which the weld is being placed. If the the arc is directed to the puddle of molten material formed either in bulk welding or otherwise, the physical force of the arc likewise disturbs the puddle and if the arc is of sufficient size, it will force aside enough of the puddle that the arc will directly contact the base metal. When the arc strikes the base metal, some of it is melted and this molten base metal mixes with and dilutes the mixture of molten metal from the electrode and the molten alloy from the granular layer in the puddle. A certain amount of dilution is usually desirable. However, dilution resulting from direct contact of the arc with the base metal is generally undesirable where the analysis of the final weld coating needs to be within narrow limits because the amount of base metal melted and the consequent dilution are difficult to control. Additionally, excessive contact of the arc with the base metal may produce undesirable effects on the base metal such as detrimental heat treatment, distortion and structural weakening.

Whether or not an arc directly contacts the base metal can be easily determined by visual examination during welding if no flux is used and by examination of a cross section of the weld after welding if flux conceals the arc during welding.

In some bulk welding and other welding using a consumable electrode, there may be sufficient differences in the melting points of the metals in the electrode and/or granular material and a rapid enough hardening ("quick freezing") of the puddle that the higher melting point metals will solidify before complete mixing takes place in the puddle and thus leave a nonhomogeneous composition in the weld.

In bulk welding with a single electrode, the arc can, of course, be prevented from contacting the base metal by reducing the amount of current in the electrode but this reduces the temperature and size of the puddle and exaggerates the problem of quick freezing.

It is a general object of the present invention to provide a method of bulk welding by which the amount of dilution of the weld by the base metal may be carefully controlled and there is eliminated or substantially reduced the "quick freezing" before complete mixing of the material in the puddle.

Another object of the present invention is to provide a method for bulk welding in which the desired amount of dilution of the base metal is caused by the heat from a super-heated puddle which in turn melts a thin skin of the base metal rather than having the base metal melted by direct contact from the arc.

A still further object of the present invention is to provide a method of bulk welding utilizing at least two consumable electrodes moved in tandem in a generally linear direction along a layer of alloy granules with the electric arc from the lead electrode being directed to the edge of the granules adjacent the puddle of melted granules formed by the arc from the lead electrode and/or to the unmelted granules and with the arc from the trailing electrodes being directed to the puddle formed by the lead electrode with the arcs being free of contact with the base metal.

By the use of tandem electrodes in this manner, the trailing electrodes prevents "quick freezing" and allows complete mixing of the metals involved in the weld. By varying the distance between the electrodes, so long as they are directed to the same puddle, the amount of heating of the base metal and consequently the amount of dilution by the base metal is controlled. If desired, the electrodes may be oscillated from side to side during the generally linear movement of the welding head and in this manner cover a greater width than without oscillation.

BRIEF DESCRIPTION OF THE DRAWING

The figure is a schematic illustration of the use of tandem electrodes in a preferred example of the present invention.

DESCRIPTION OF THE PREFERRED EMBODIMENT

Referring now to the figure, there is illustrated a cross section of a portion of base metal B to which a layer of weld coating 10 is to be secured. A layer of alloy granules 12 is placed on the base B by any conventional manner. If desired, a layer of flux may be placed over the alloy granules 12.

A lead consumable electrode 14 and a trailing consumable electrode 16 are moved simultaneously in tandem from left to right as viewed in the figure. The arc 18 from the lead electrode 14 melts both itself and the alloy granules 12 and forms a puddle 20 as the arc 18 advances. If the alloy granules 12 are of higher electrical resistance than the puddle 20, and this is normal, a portion of the arc 18 from the lead electrode 14 will be directed against the edge of the alloy granules 12 and a portion against the puddle 20 as illustrated. If the alloy granules 12 are of sufficiently low enough electrical resistance, nearly all the arc 18 from the lead electrode 14 will be directed against the alloy granules 12 where they join the puddle 20.

The trailing electrode 16 is moved at the same speed as the lead electrode 14 and close enough to the lead electrode 14 that the arc 22 from the trailing electrode 16 passes to the same puddle 20 as the arc 18 from the lead electrode 14. Preferably the distance between the electrodes is between ¼ and ¾ inch and the current is divided aproximately equally between the two electrodes. If desired, more than one trailing electrode 16 may be moved in tandem with the lead electrode 14.

Example 1

A weld bead of type 304L stainless steel is deposited on a base metal surface using two ¹⁄₁₆ inch diameter 304L stainless steel wire electrodes spaced ⅜ inch apart with 35 volts to each electrode, a current of 425 amperes divided aproximately equally between the two electrodes, and alloy granules composed of 304L stainless steel. The electrode feed is about .22 pound per minute and the linear travel 18 inches per minute. The electrodes are oscillated at the rate of 70 oscillations per minute over a width of 1 inch giving a bead width of 1⅗₁₆ inches. The current in each of these two electrodes is aproximately half of what might be expected in a normal single wire operation to deposit electrode at the same rate. Consequently, the force of each of the arcs is much less than the force of the arc in a single electrode arrangement.

Example 2

A monel weld bead is deposited using two ¹⁄₁₆ inch diameter nickel electrodes spaced ⅜ inch apart with 35 volts to each electrode and a total current of 450 amperes divided approximately equally between the two electrodes. The alloy granules are 43% copper, 3% titanium, and 54% nickel. The base metal is pre-heated to 200° F. by gas burners, the electrode feed is .30 pound per minute, the linear movement 18 inches per minute and the electrodes oscillated at the rate of 80 oscillations per minute over a width of 1¹⁄₁₆ inches. A welding operation using a single electrode but with the 450 amperes of current being supplied to one electrode is common but deposits electrode at a lesser rate and the force of the arc from the single electrode is much greater than the force of the arc from each of the tandem electrodes.

From the foregoing discussion, examples and description of the invention, it is apparent that the objects set forth herein as well as others have been achieved. Those skilled in the art will recognize that the principles of this invention may be applied in several ways, only a few of which have been exemplified here specifically. Accordingly, the invention is to be limited only by the spirit thereof and the scope of the appended claims.

What is claimed is:
1. The method of welding a base metal comprising:
   (a) depositing a layer of alloy granules on the surface of the base metal,
   (b) moving simultaneously at least two consumable electrodes in tandem in a generally linear direction along the layer of alloy granules, said consumable electrodes including a lead electrode and at least one trailing electrode,
   (c) maintaining at least a portion of an electric arc from the lead electrode to the edge of the granules adjacent a puddle of melted granules formed by the lead electrode, and
   (d) maintaining an arc from the trailing electrode to the puddle, said arcs being free of contact with the surface of the base metal.
2. The method of claim 1 in which the number of consumable electrodes is two.
3. The method of claim 1 in which the consumable electrodes are spaced between about ¼ and ¾ of an inch apart.
4. The method of claim 1 including maintaining an approximately equal amount of electric current to each of the consumable electrodes.
5. The method of claim 3 including maintaining an approximately equal amount of electric current to each of the consumable electrodes.

References Cited

UNITED STATES PATENTS

| | | | |
|---|---|---|---|
| 2,320,824 | 6/1943 | Landis et al. | 219—73 |
| 2,620,423 | 12/1952 | Komers et al. | 219—73 |
| 2,931,886 | 4/1960 | Nunnelee et al. | 210—76 |
| 3,192,079 | 6/1965 | Takagi et al. | 219—73 |
| 3,204,077 | 8/1965 | Arnoldy | 219—76 |
| 3,264,445 | 8/1966 | Arnoldy | 219—76 |

JOSEPH V. TRUHE, Primary Examiner
W. D. BROOKS, Assistant Examiner

U.S. Cl. X.R.
219—76